Sept. 8, 1959 G. E. GILLIAM 2,903,679
PROGRAM CONTROLLING AND TRANSMITTING APPARATUS
Filed July 27, 1955 2 Sheets-Sheet 1
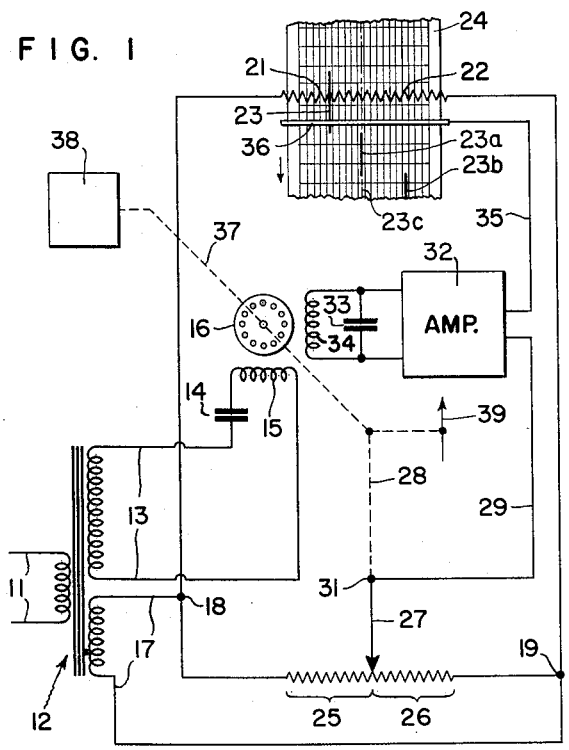
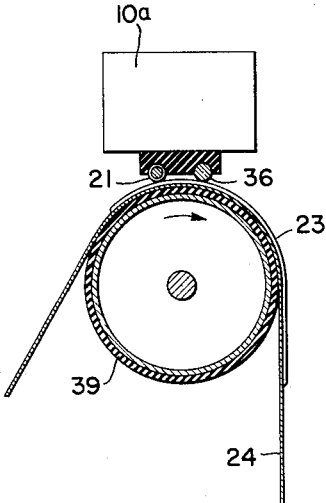
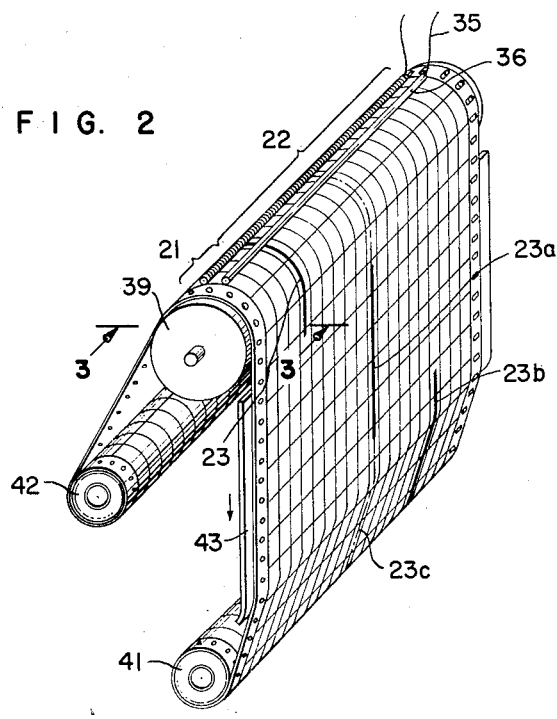
INVENTOR.
GEORGE E. GILLIAM
BY *Henry L. Hanson*
ATTORNEY.

Sept. 8, 1959            G. E. GILLIAM            2,903,679

PROGRAM CONTROLLING AND TRANSMITTING APPARATUS

Filed July 27, 1955            2 Sheets-Sheet 2

*INVENTOR.*
GEORGE E. GILLIAM

BY *Henry L. Hanson*

ATTORNEY.

United States Patent Office 2,903,679
Patented Sept. 8, 1959

2,903,679

PROGRAM CONTROLLING AND TRANSMITTING APPARATUS

George E. Gilliam, Philadelphia, Pa., assignor to Minneapolis-Honeywell Regulator Company, Minneapolis, Minn., a corporation of Delaware Application July 27, 1955, Serial No. 524,768

4 Claims. (Cl. 340—187)

A general object of the present invention is to provide a simple, reliable, and efficient chart program control follower for a program controller which will automatically effect an indicating and control action in accordance with the pattern of an electrically conductive line formed on a chart.

Heretofore, pattern following devices have used various forms of program line followers such as photoelectric cells or electrically sensitive probes to detect a deviation of a program line from a predetermined path. As the program line in such following devices is moved to either the right or left side of the follower it has been necessary to activate an electrically energized circuit in order to move the follower to a position in which it is in alignment with the newly positioned program line. Because such followers must be repositioned in this traversing manner from time to time in order to keep them aligned with their associated program line such follower action will cause a delay in the time required to affect the transmittal of such a control action to a remotely located program receiver. Furthermore, when large step changes are required to occur in the program line of such devices the speed at which the chart is driven must be greatly reduced in order to permit the followers of this type to catch up to such a step change.

The program control follower in this application is always kept in constant contact with its associated conductive line and therefore requires no slowing down of the chart speed in order to keep its follower aligned with its associatsed program line. It therefore becomes another object of the present invention to provide a program control follower that is able to transmit the effect of step changes in the program line to a program receiver at speeds which will far exceed those of the aforementioned pattern following devices.

A more specific object of the present invention is to provide a program controller with a control following mechanism comprising a slidewire which is constantly kept in direct contact with a conductive program line on a chart and which mechanism when displaced relative to the line on the chart will effect a control action in accordance with the magnitude of said displacement.

The present invention is concerned with a program following mechanism for effecting, for example, a plurality of preselected time control actions on a raw material as it passes through an industrial process. Certain process operations, for example, require that the quantity of heat being applied to the raw material be changed at preselected periods of time. It is therefore another object of the invention to provide a chart program control follower whose function it may well be to automatically change the quantity of the heat being applied to a raw material at predetermined intervals of time after the raw material enters the process until a satisfactory end product is produced.

Still another object of the present invention is to provide various modified forms of resilient mountings for a conductive program line on a chart so that a more positive contact may be achieved when such a conductive line is moved along a slidewire.

The various features of novelty which characterize my invention are pointed out with particularity in the claims annexed to and forming a part of this invention. For a better understanding of the invention, its advantages, and specific objects attained with its use, reference should be had to the accompanying drawings and descriptive matter in which I have illustrated and described preferred embodiments of the invention.

In the drawings:

Fig. 1 is a schematic arrangement of an electrical circuit which will perform the program control and transmitting functions noted supra;

Fig. 2 shows how a part of the control circuit shown in Fig. 1 may be used in conjunction with conductive lines drawn on a strip chart;

Fig. 3 is a view taken along the line 3—3 of Fig. 2;

Figure 4:
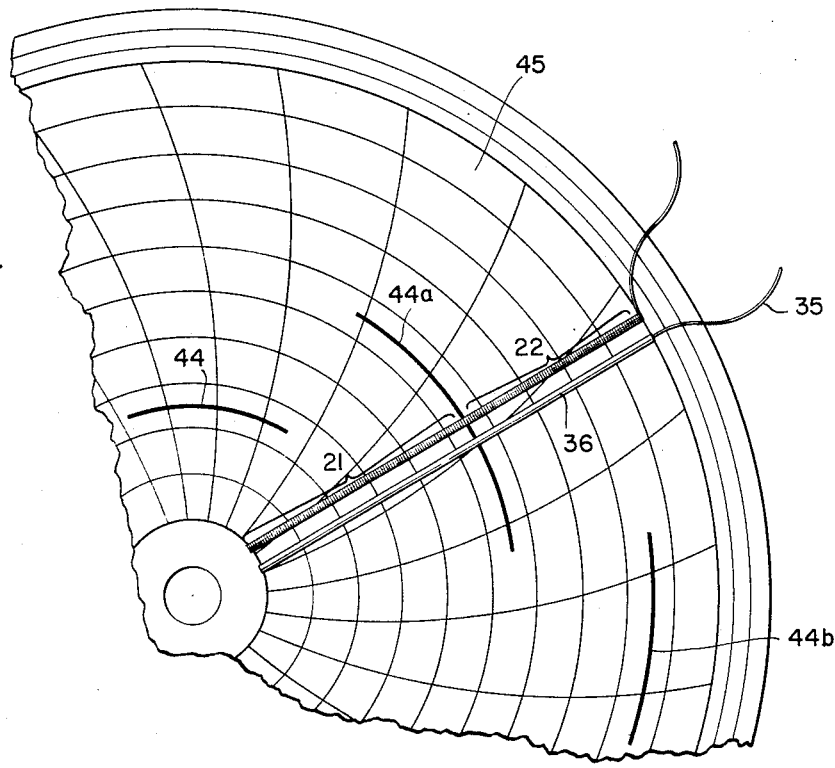
Fig. 4 shows how a part of the circuitry shown in Fig. 1 may be arranged to cooperate with a plurality of conductor program lines on a circular chart.

In the schematic showing of the program controller in Fig. 1 the numeral 10 designates an electrical circuit having power lines 11 leading from a source of alternating current. These leads 11 are in turn connected with a transformer 12. Leads 13 from the secondary winding of the transformer are in turn connected through a capacitor 14 with one of the windings 15 of a reversible motor 16. Leads 17 are also shown extending from the transformer 12 to the respective terminal portions 18, 19 of an electrical network which is here shown to be of the Wheatstone bridge type. Between the terminals 18, 19 there are shown two resistant leg portions 21, 22 which form a slidewire. A portion of a conductive program line 23 mounted on a chart 24 is shown separating the slidewire into the two aforementioned resistant leg portions 21, 22.

Between the bridge terminals 18 and 19 there is also shown two resistant leg portions 25, 26 forming a second slidewire. A wiper 27 is shown separating the second mentioned slidewire into the two resistant leg portions 25 and 26. This wiper may be connected by means of a suitable mechanical linkage such as the linkage indicated by the dotted line 28 to the output shaft of the motor 16. A lead 29 is shown connected to a terminal portion 31 of the wiper 27 at one of its ends and to an amplifier 32 at its other end. The output of amplifier 32 contains a capacitor 33 in parallel with a second winding 34 of the motor 16. A lead 35 is shown connecting the amplifier 32 to a collector bar 36. The collector bar is shown located in a position that is parallel to the slidewire portions 21, 22 and in direct contact with the program line 23.

This view also schematically shows a mechanically actuated link 37 for transmitting the output motion of the motor 16 to a program receiver 38.

Fig. 2 shows a means by which the chart 24 may be moved by a suitable chart drive drum 39 from a supply drum 42 onto a take-up spool 41. A conventional chart guide plate 43 is also shown in this figure for guiding the chart as it passes in either an upward or downward direction between drum 39 and take-up spool 41. Although not shown, any chart driving mechanism e.g. a sprocket drive may be used to drive drum 39 at some preselected desired speed.

Fig. 3 shows the collector and slidewire shown in Figures 1 and 2 in contact with the conductive line portion 23 of the conductor program line 23, 23a, 23b shown in Figs. 1 and 2. This Figure 3 shows a housing 10a for retaining a major portion of the electric circuit 10 shown in Fig. 1.

Fig. 4 shows how the slidewire 21, 22 may be located with respect to a conductive line 44, 44a, 44b on a circular chart 45.

Figure 5:
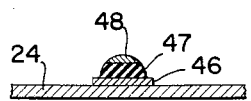
Fig. 5 shows a means of flexibly mounting a conductive program line on a chart.

Fig. 5 shows an adhesive tape 46 attached to the paper 24 on one side and to a resilient material such as rubber or a plastic material 47 on its other side. The upper surface of this flexible material 47 may be bonded to an electrically conductive material 48 as shown by any suitable bonderizing material.

Figure 6:
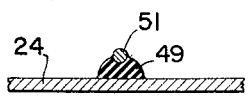
Fig. 6 shows how a conductive program wire may be flexibly mounted on a chart.

Fig. 6 shows how a flexible material such as rubber cement 49 may be used to flexibly attach a conductive program wire 51 to a chart paper 24.

Figure 7:
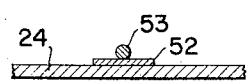
Fig. 7 shows still another way of attaching a conductive line in the form of a wire to a chart.

Fig. 7 shows how a tape 52 having an adhesive material on its upper and lower surface may be used to flexibly attach a conductive program wire 53 to a chart paper 24.

It should be noted that any one of the modified forms of the conductive program lines shown in Figs. 5, 6, or 7 may be substituted for the conductive ink lines shown in Figs. 1, 2, or 4.

Figure 8:
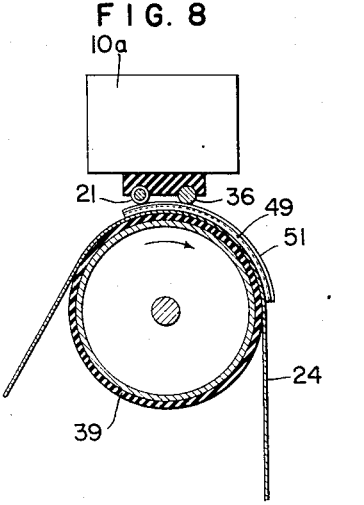
Fig. 8 shows how a view along the line 3—3 of Fig. 2 would appear if the flexibly mounted conductive program line as shown in Fig. 6 were used to replace the conductive line shown in Fig. 2.

Fig. 8 shows how the sectional view on the line 3—3 of Fig. 2 would appear if a flexibly mounted program line comprising the mounting 49 and wire 50 shown in Fig. 6 were substituted for the conductive ink line 23 shown in Fig. 2.

In the operation of the apparatus shown in Fig. 1 a conventional chart drive, not shown, comprising a chart drive motor and sprocket may be used to drive the chart 24 at a predetermined speed which speed will be dependent upon the characteristic of the process being controlled. As the chart 24 is moved at this predetermined speed, the conductive line 23 on the chart 24 will be moved over the chart drive roller 39 and into contact with a portion of the conductive program line 23 on chart 24 as shown in Fig. 2. When the conductive program line 23 has been moved from a reference line 23c position shown in Fig. 1 the amount of resistance in the leg portion 21 of the bridge 21, 22, 25, 26 will be decreased while the amount of resistance in a second leg portion 22 of the bridge is proportionately increased. Movement of the conductive line 23 to the position shown in Figs. 1 and 2 will thus cause an unbalance of the bridge 21, 22, 25, 26 to occur. As this unbalance is effected a current will flow from the collector 36 which is also in contact with the same conductive line 23 through the lead 35 to the amplifier 32 to energize the coil 34 of the motor 16 in such a fashion that the motor will cause the wiper 27 to move along the resistances 25, 26 in such a direction as to balance the bridge at a new null point. In other words, any unbalance between the leg portions 21, 22, and leg portions 25, 26 of the bridge will cause the signal that is passing through the amplifier 32 to drive the motor 16 in such a direction as to remove such an unbalance existing in the bridge.

It can thus be seen that the indicator 39 attached to the shaft of the motor 16 may be used to directly indicate the magnitude of displacement that is occurring between the conductive program line 23 and the program control follower 21, 22, 36. Regardless of whether the line 23 is of the straight line variety as shown or of an irregular curved shape not shown, the clockwise or counterclockwise movement of the indicator 39 will thus show whether the position of contact between the conductive line 23 and slidewire 21, 22 is shifting to the right or left of a reference line position 23c.

If the conductive line 23 is drawn in the straight line fashion as shown in Figs. 1 and 2, the balancing motor 16 will retain the indicator 39 in the aforementioned bridge balance position during the entire time in which the slidewire 21, 22 and collector 36 is in contact with this line.

If it is desired that the motion of the shaft of the balancing motor be transmitted to a program receiver 38 such as a temperature controller, a suitable mechanical linkage 37 need only be added between the motor shaft and such a receiver to accomplish this. With this latter arrangement any step change or deviation in the program line 23 from a predetermined reference line position 23c on the chart 24 may be used to effect a change in control action. Such a control action may be the controlling of the quantity of heat being applied to a raw material passing through a process with the heat being programmed according to the schedule on the chart. Such a temperature control program line which might well be used for such a job might well be the conductive program line 23b, 23a, 23 as shown in Fig. 2. As the chart is moved at some pedetermined speed in a downward direction from chart drive roller 39 to the take-up roller 41 as indicated by the arrow, the conductive line 23b will be the first conductive line to engage the following mechanism 21, 22, 36. The engagement will take place with the following mechanism at a point three quarters of the way across the chart 24. When this engagement takes place the resistance in the leg 21 of the bridge shown in Fig. 1 will be increased while the resistance in the leg portion 22 of this same bridge will be proportionately reduced. The contact of the conductive line 23b with the slidewire 21, 22 will cause an unbalance in the bridge circuit 21, 22, 25, 26 and a follow-up rebalancing bridge action by the motor 16 as previously described will take place. The rebalancing action of the motor 16 will effect a control action on the program receiver 38 through the mechanical linkage which is directly proportional to the magnitude of displacement that has occurred between the reference line 23c and the line 23b which is, at this time, in contact with the slidewire 21, 22 and collector 36. The indicator 39 and mechanical linkage 37 will thus be caused to rotate some predetermined amount away from the vertical position of the indicating arrow 39 when the conductive line 23b is in contact with the following mechanism 21, 22, 36 by the aforementioned null balancing action.

As the chart is caused to move further in the direction of the arrows shown, the conductive line 23a is so located on the chart 24 that it will be immediately brought into contact with the slidewire 21, 22 and collector 36 portion of the following mechanism, as soon as the upper end of the program line 23b breaks contact with the slidewire 21, 22 and collector 36. Since the conductive line 23a is on the preestablished reference line 23c the shaft of the motor 16 and indicator 39 attached thereto will be rotated to the vertical indicating position shown so as to rebalance the bridge at the preestablished null balance position. This motor rebalancing action will thus cause the control action transmitted to the program receivers through the mechanical linkage 37 to be again adjusted in the same direction as the indicator 39.

As the chart is moved still further in a downward direction as indicated by the arrow in Fig. 2, the contact line 23a will be moved out of engagement with the slidewire and collector following means 21, 22, 36 and the conductive line 23 will be moved into engagement therewith as shown in Fig. 2. When this new contact between the conductive line 23 and the slidewire 21, 22 of the following mechanism takes place, the resistance in the leg portion 21 of the bridge will be decreased and the resistance in the right portion 22 proportionately increased. This action will again cause an unbalancing in the bridge circuit 21, 22, 25, 26 to take place as previously described and a bridge rebalancing follow-up action of the motor 16 to occur. This rebalancing action of the motor will cause the shaft of the motor 16 and indicator attached thereto to be rotated from its vertical position in a direction opposite to that which occurred when the chart had been moved from a preestablished reference line 23c into contact with the conductive line 23b.

As the shaft of the motor 16 is rotated to this new null balance position the mechanical linkage 37 will cause a new control action to be transmitted to the program receiver 38 by means of the mechanical linkage 37. The control action transmitted in this manner will be directly proportional to the magnitude of displacement that has occurred between the preestablished line 23c and the conductive line 23.

It can thus be seen that when large step changes in the program line must take place such as the step changes between the program line 23b and 23a, or 23a and 23, said step changes may be substantially immediately transmitted to a program receiver 38 without delay. It can also be seen that the chart speed of such a program controller need not be lowered when said step changes occur because of the immediate response that the balancing motor 16 is able to effect.

The form of the invention, as disclosed in Fig. 4 of the drawing, is merely shown to indicate how the slidewire 21, 22, and collector 36 may be used in conjunction with a portion of a conductive program line 44, 44a, 44b drawn on a circular chart 45. The conductive lines 44, 44a, and 44b will contact the portion 21, 22 and 36 of the following mechanism in a manner similar to that already described for the showing disclosed in Fig. 2 except that instead of a chart being moved in a downward direction the chart is rotated in a rotary fashion at some preestablished chart speed.

The disclosures of Figs. 5, 6, and 7 set forth various modified forms of resilient mountings which may be used for a conductive program line in either the strip chart such, as shown in Fig. 2, or the circular chart, as shown in Fig. 4. The purpose of such resilient mountings has been to provide a more positive contact between the conductive program line and the fixedly mounted contacting parts 21, 22, 36 of the following mechanism. If the type of flexible conductor program line shown in Fig. 6 were substituted for the program line 23 shown in Fig. 2, an end view of such a line would be as shown in Fig. 8 of the drawing. In this Fig. 8 disclosure the chart paper 24 is shown passing over the chart drive roller 39. Attached to this chart paper 24 there is shown a flexible material such as rubber cement 49 which is adapted to conform to the contour of the chart 24. Fixedly attached to the upper central portion of this rubber cement material 49 there is shown a conductive wire 51 in contact with the portion 21 of the slidewire 21, 22 as well as being in contact with the collector bar 36. By using a small amount of flexible material such as rubber cement in this manner the conductive program wire mounted thereon may be held in constant bias with the following mechanism 21, 22, 36 so as to assure good electrical contact between these two contacting members.

In a similar advantageous manner the modified form of the flexible conductive mounting shown in Fig. 5 may be used. In Fig. 5 an adhesive tape is stuck on its lower side to the chart paper 24 and on its upper side to a flexible material such as rubber or plastic. A conductive material may be bonderized to the upper surface of the flexible material 47 by any suitable bonderizing technique.

In certain program controllers it may be desirable to mount an extra thick piece of adhesive tape 52 to the upper surface of a chart paper 24 as shown in Fig. 7 so that the adhesive tape may provide a resilient mounting for a conductive wire mounted on its upper surface when it is moved into contact with the following mechanism 21, 22, 36 of the apparatus shown in Fig. 2.

It can thus be seen that the modified forms of resilient mountings for a conductive program line as shown in Figs. 5, 6, and 7 can be advantageously used with the following mechanism 21, 22, 36 to provide a more positive contact than would be possible if a conventional conductive ink line on a chart were used.

Since the program controller disclosed in this application merely requires that a conductive line be mounted on a chart which is driven by a conventional chart drive into engagement with a slidewire-collector following mechansim, a great simplification in the components heretofore required for such program controllers is achieved.

The present invention also provides a very reliable type of program controller since the input of a balancing motor will continuously transmit a mechanical input signal to a program receiver which signal is directly proportional to the relative displacement occurring between the conductive program line on a chart and an associated slidewire.

Furthermore, through the use of a flexibly mounted type of conductive program line as shown in Figs. 5–8 a more positive contact between such a conductive line and a following mechanism is achieved which heretofore could not be acquired.

Finally, the most important advantage and achievement that has been made possible with the present invention is that since the following mechanism is always kept in contact with the conductive line there is no need in reducing the speed of the program chart when a step change in the conductive line occurs.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. An electric null balance bridge type program controller, comprising the combination of the moveable chart having a conductive program line drawn upon one side of said chart and having a portion thereof in contact with an elongated wound slidewire, said contacting portion of said conductive program being operably connected to separate said slidewire into two resistant leg portions of said bridge, an elongated collector bar positioned in close parallel spaced apart relationship with the entire length of said slidewire, a rotatable cylindrical chart drive roller positioned in driving engagement against an opposite side of said chart and having a longitudinal axis that is positioned between said elongated slidewire and said collector bar, said roller being adapted to move said chart from a supply spool to a take up spool while it simultaneously rolls in sequence a plurality of straight intermittent laterally displaced portions of said conductive program line that are fixedly attached to said chart into different points of electrical contact along said winding of said slidewire and said collector bar as said chart movement occurs to thereby alter the resistance in each of said leg portions of said bridge and a followup rebalancing means electrically connected to said slidewire and collector bar to transmit a program signal that is representative of the amount of displacement that occurs between each successive portion of said program line as it is brought into contact with said slidewire.

2. An electric null balance bridge type program controller, comprising the combination of a moveable chart having a conductive program line drawn upon one side thereof, a wound slidewire extending transversely of said moveable chart and forming a part of said bridge, an elongated collector bar positioned in close spaced apart parallel relationship with the entire length of said slidewire, a portion of said conductive program line being in direct physical contact with said slidewire and said collector bar to separate said slidewire into two resistant leg portions of said bridge, a rotatable cylindrical chart drive roller positioned in driving engagement against the opposite side of said chart and being in direct contact with a portion of said chart that is located between said chart portion that contains said conductive program line that is in contact with said slidewire and said collector bar, said roller being adapted to move said chart from a supply spool to a take up spool while it simultaneously rolls in sequence a plurality of straight intermittent laterally displaced portions of said conductive program line drawn on said chart into different points of electrical contact along said winding of said slidewire and collector bar, said lines being located to the left, right and center of said slidewire and said bar as said chart movement occurs to thereby alter the resistance in one of said leg portions of said bridge to a value that is below, at or above a preselected null value while the resistance of the said other leg portion is charged to a value that is above, at or below said selected value and a transmitting means electrically connected to said network rebalancing circuit to transmit a program signal that is representative of the amount of displacement that occurs between each successive portion of said program line as it is brought into contact with said slidewire.

3. A program controller, comprising the combination of a moveable chart having a non-linear conductive program line thereon, a rotatable chart drive roller adapted to simultaneously move said chart and program line thereon into direct rolling electrical point contact with a portion of a wound slidewire and a collector bar whose longitudinal axis is parallel to said slidewire, said slidewire and bar extending across said chart and having their longitudinal axis passing through a vertical plane that is on either side of the longitudinal axis of said roller, said wound slidewire forming two leg portions of an electrical bridge network, said deviation in the position of said conductive line with respect to said winding of said slidewire acting to directly unbalance said network as it is moved into electrical rolling point contact with the winding of said slidewire, a network rebalancing circuit comprising said collector bar which forms the remaining portions of said network, said circuit acting upon said unbalance to adjust the resistance in the remaining portions of said network to a new balance position and an electrical transmitting means connected to said network rebalancing circuit for transmitting an output signal to a program receiving means whose magnitude varies in accordance with the changes which occur between the displacement of said program line and the point on the winding of the slidewire with which it is in contact.

4. An electric null balance bridge type program controller, comprising a wound slidewire extending transversely of a moveable chart, said chart having a laterally, displaced conductive program line mounted by means of a flexible member thereon in electric point contact with said slidewire, a chart drive roller to retain said chart and program line thereon in good electrical rolling circuit with said slidewire and followup rebalancing means electrically connected to said slidewire and collector bar to transmit a program signal that is representative of the amount of displacement that occurs between each successive portion of said program line as it is brought into contact with said slidewire.

References Cited in the file of this patent
UNITED STATES PATENTS

| | | |
|---|---|---|
| 2,073,948 | Schofield | Mar. 16, 1937 |
| 2,492,244 | Shivers | Dec. 27, 1949 |
| 2,761,102 | Brown | Aug. 28, 1956 |